US012553009B2

(12) United States Patent
Randall et al.

(10) Patent No.: US 12,553,009 B2
(45) Date of Patent: Feb. 17, 2026

(54) DETERGENT FORMULATIONS

(71) Applicant: The Procter & Gamble Company, Cincinnati, OH (US)

(72) Inventors: Sherri Lynn Randall, Hamilton, OH (US); Jonathan Harris Flannery, Cincinnati, OH (US); Jeffrey Scott Van Komen, Wilmington, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 453 days.

(21) Appl. No.: 18/320,284

(22) Filed: May 19, 2023

(65) Prior Publication Data

US 2023/0374411 A1 Nov. 23, 2023

Related U.S. Application Data

(63) Continuation-in-part of application No. 17/749,312, filed on May 20, 2022, now abandoned.

(51) Int. Cl.

| | |
|---|---|
| ***C11D 1/722*** | (2006.01) |
| ***C11D 3/30*** | (2006.01) |
| ***C11D 3/386*** | (2006.01) |
| ***C11D 3/42*** | (2006.01) |

(52) U.S. Cl.

CPC ................ *C11D 1/722* (2013.01); *C11D 3/30* (2013.01); *C11D 3/386* (2013.01); *C11D 3/42* (2013.01); *C11D 2111/12* (2024.01)

(58) Field of Classification Search

CPC ........... C11D 1/722; C11D 3/30; C11D 3/386; C11D 3/42; C11D 2111/12

See application file for complete search history.

(56) References Cited

U.S. PATENT DOCUMENTS

| | | | |
|---|---|---|---|
| 5,965,514 | A | 10/1999 | Wierenga et al. |
| 2006/0123562 | A1 | 6/2006 | Ghosh |
| 2007/0185004 | A1 | 8/2007 | Kilkenny et al. |
| 2011/0207786 | A1 | 8/2011 | Callahan |
| 2013/0237470 | A1 | 9/2013 | Bockmuehl |
| 2015/0272124 | A1 | 10/2015 | Pedersen |
| 2017/0175036 | A1 | 6/2017 | Cermenati |
| 2019/0177661 | A1 | 6/2019 | Walters et al. |
| 2019/0373886 | A1 | 12/2019 | Karandikar |
| 2019/0380335 | A1 | 12/2019 | Man et al. |
| 2020/0337303 | A1 | 10/2020 | Lan |

FOREIGN PATENT DOCUMENTS

| | | | | |
|---|---|---|---|---|
| EP | 0133900 | A2 | 3/1985 | |
| EP | 1523545 | B1 * | 9/2008 | .............. C11D 3/33 |
| EP | 3263687 | A1 | 1/2018 | |
| GB | 2340843 | A | 3/2000 | |
| WO | 9216244 | A1 | 10/1992 | |
| WO | 2004009754 | A1 | 1/2004 | |
| WO | 2013098547 | A1 | 7/2013 | |
| WO | 2015047998 | A1 | 4/2015 | |
| WO | 2018007805 | A1 | 1/2018 | |
| WO | 2021156297 | A1 | 8/2021 | |

OTHER PUBLICATIONS

PCT Search Report and Written Opinion for PCT/US2023/022833 dated Aug. 16, 2023, 9 pages.
Carvalho, Anderson. "E2406 33185 PDF", Retrieved From: https://www.scribd.com/document/466177193/E2406-33185-pdf, May 2016, 18 Pages.
All Office Actions; U.S. Appl. No. 17/749,312, filed May 20, 2022.
Unpublished U.S. Appl. No. 17/749,312, filed May 20, 2022, to Sherri Lynn RANDALL et al.

* cited by examiner

*Primary Examiner* — Jeffrey S Lundgren
*Assistant Examiner* — Ibrahim D Bori
(74) *Attorney, Agent, or Firm* — Abigail O. Idokogi; Andrew J. Mueller

(57) ABSTRACT

A laundry detergent composition can include a nonionic surfactant, an amine oxide, and a quaternary ammonium salt biocide, where the composition is micellar.

17 Claims, No Drawings

DETERGENT FORMULATIONS

FIELD OF THE INVENTION

Laundry detergent formulations can include a nonionic surfactant, an amine oxide, and a quat biocide.

BACKGROUND OF THE INVENTION

Biocides are commonly used in household products to help combat pathogens which have entered the home. These household products can include, for example, hard surface cleaners, fabric care compositions, dish care compositions, etc. Formulating with biocides, however, can be tricky as other ingredients, like anionic surfactants or even long chain nonionic surfactants, can impede the biocides. In addition, it is desirable to use only the minimum amount of biocide necessary for the desired task. Thus, it is beneficial to find and utilize ingredients in a laundry detergent composition, for example, which do not impede the desired biocide or which can be formulated in such a way as to minimize any impediment to the biocide. As such, there is a need for ingredients which are suitable for formulation with a biocide and formulation of such into an acceptable laundry detergent composition.

SUMMARY OF THE INVENTION

Included herein, for example, is a laundry composition, comprising: a) about 3% to about 40%, by weight of the composition, of a nonionic surfactant; b) an amine oxide; and c) about 0.5% to about 3%, by weight of the composition, of a quaternary ammonium salt biocide; wherein the ratio by weight of the amine oxide to the nonionic surfactant is from about 4:1 to about 1:2, and the composition has micelles.

Also included herein, for example, is a laundry detergent composition, comprising: a) from about 25% to about 75%, by weight of the composition of total surfactant, comprising; i) an amine oxide, and ii) from about 3% to about 40%, by weight of the composition, of an ethoxylated nonionic surfactant with an average carbon chain length of about 10 to about 16; and b) from about 0.5% to about 3.0%, by weight of the composition, of a quaternary ammonium salt biocide; wherein the composition has a pour viscosity of about 140 to about 1500 cps, wherein the ratio by weight of the amine oxide to the nonionic surfactant is from about 4:1 to about 1:2, and the composition has micelles.

Likewise included herein is a method of enhancing biocidal impact of a dialkyl dimethyl quaternary ammonium salt in a micellar laundry detergent composition comprising the dialkyl dimethyl quaternary ammonium salt and an alkoxylated nonionic surfactant with an average carbon chain length of about 10 to about 16, comprising adding to the laundry composition an amine oxide, so that it is in a weight ratio with the alkoxylated nonionic surfactant of about 4:1 to about 1:2.

These and other incarnations will be more fully described throughout the specification.

DETAILED DESCRIPTION OF THE INVENTION

For consumer product companies, there is an opportunity to help consumers who are interested in products which can effectively reduce and/or eliminate certain bacteria on laundry. biocide, it can be possible to find ways to formulate around such issues. Unfortunately, it is difficult to know, at times, whether a biocide is being suppressed in a formulation or just doesn't work for the target application. So, when attempting to formulate a laundry detergent composition with a biocide for antibacterial properties, the biocide can be tested for its biocidal efficacy as part of the formulation. This allows a formulator to understand whether the biocide will meet the biocidal goals as part of the laundry detergent composition. When looking at the biocidal impact, an average Log R on *Staphylococcus aureus* and *Klebsiella pneumoniae* of about 1.1 or less is considered to have an insufficient biocidal impact, while an average of about 2.8 or more is considered to have a preferred level of biocidal activity. A biocidal activity range of about 1.2 to about 2.7 could be acceptable depending on the application, but here is less preferred. The Log R can be measured in accordance with ASTM E2406-16 with the specifics as noted further below. The average Log R is calculated by adding together the Log R for each tested bacteria and dividing by 2.

For example, see Table 1 below which shows testing of biocidal impact on both *Staphylococcus aureus* and *Klebsiella pneumoniae* for a formulation containing different types and levels of ethoxylated nonionic surfactant. Here, biocidal impact is being measured as the average log reduction (Log R) on the 2 bacteria (*K. pneumoniae* ATCC 4352 and *S. aureus* ATCC 6538). As can be seen from the table, there is no appreciable biocidal impact from the composition as tested.

TABLE 1

| Test Leg | Nonionic C12-14 EO9 % | Nonionic C14-15 EO7 % | Quat Biocide % | Avg. Log R of *Staphylococcus aureus* and *Klebsiella pneumoniae* |
|---|---|---|---|---|
| 1 | 29.6 | 0 | 0 | −0.1 |
| 14 | 8.0 | 7.6 | 0 | −0.2 |

Once the biocidal impact of the composition itself has been established as not meeting biocidal criteria, a biocide can be added to the composition to determine if this will help to meet biocidal impact goals. For example, as seen in Table 2 below, a quaternary biocide is added to the formulations from Table 1 and biocidal impact is again measured. As can be seen from Table 2, there was no appreciable biocidal impact with the addition of the biocide to the composition with the high level of nonionic (Test Leg 2), however, there was a slight but still insufficient improvement in biocidal impact for the composition with the lower level of ethoxylated nonionic surfactant (Test Leg 9).

TABLE 2

| Test Leg | Nonionic C12-14 EO9, % | Nonionic C14-15 EO7, % | Quaternary Biocide*, % | Dust Sebum SRI** | Avg. Log R of *Staphylococcus aureus* and *Klebsiella pneumoniae* |
|---|---|---|---|---|---|
| 2 | 29.6 | 0 | 1.8 | 52 | −0.5 |
| 9 | 8.0 | 7.6 | 1.8 | 31 | 1.1 |

*quaternary biocide is Bardac ® 2080 from Arxada,
**stain removal index

This bump, however, did not come without a sacrifice. Table 2 also shows a significant decrease in the cleaning performance between Test Legs 2 (52) and 9 (31). This cleaning difference can likely be attributed to both the level of nonionic surfactant and the longer average carbon chain length. While both higher surfactant level and longer carbon chain length can contribute to a better cleaning performance, it appears they can have a detrimental effect on quaternary biocide antibacterial performance. As a biocidal cleansing composition needs to have both effective cleaning and antibacterial properties, this presents a challenge in formulating an effective biocidal cleansing composition. An additional challenge is that anionic surfactants are often the primary cleaning surfactant in cleansing formulations, but anionic surfactants are incompatible with cationic quaternary biocides. This means the cleaning cannot be boosted by the simple addition of an anionic surfactant.

The present inventors have surprisingly found amine oxide can be effective at potentiating the bacterial kill of a quat biocide while enabling the formulation of high levels of nonionic surfactant and longer chain length nonionic surfactants to facilitate cleaning, in addition to providing cleaning itself. This can be seen in Table 3, below. Test Leg 5 shows both the cleaning and biocidal activity measurements for a formulation with no nonionic, but including amine oxide. Amine oxide alone provided good cleaning (45.5) and allowed for the quaternary biocide to have excellent biocidal activity (5.5). However, consumers often prefer compositions which have the best cleaning, and when adding nonionic in with the amine oxide an even better cleaning benefit is observed (51.3), while still achieving a very good biocidal activity score of 3.8. Moreover, that bump in biocidal activity is achieved with the addition of both amine oxide and a quat biocide over what is seen in the individual addition of either material (Test Legs 3 (amine oxide only) and 9 (quat biocide only) versus Test Leg 4 (amine oxide and quat biocide).

TABLE 3

| Test Leg | Nonionic C12-14 EO9, % | Nonionic C14-15 EO7, % | Amine Oxide, % | Quaternary Biocide*, % | Dust Sebum SRI | Avg. Log R of *Staphylococcus aureus* and *Klebsiella pneumoniae* |
|---|---|---|---|---|---|---|
| 5 | 0 | 0 | 14 | 1.8 | 45.5 | 5.5 |
| 4 | 8.0 | 7.6 | 14 | 1.8 | 51.3 | 3.8 |
| 3 | 8.0 | 7.6 | 14 | 0 | 51.4 | 0.9 |
| 9 | 8.0 | 7.6 | 0 | 1.8 | 30.9 | 1.1 |

Without being bound by theory, it is believed amine oxide improves the compatibility of the quat with nonionic surfactant, potentially by disrupting interactions of the nonionic's tails with the tails of the biocide, as well as the nonionic head group and the quat biocide head group. This may help prevent the biocide from being trapped in the micelles of a detergent composition, making it more available to the fabric surface and bacteria. This allows a high level of nonionic surfactant to be used to provide good cleaning while also enabling the quat to provide an antibacterial benefit.

Another reason high levels of surfactant (i.e. about 25% or more) are preferred in such compositions is that they help contribute to the pour viscosity. A pour viscosity that is too low (i.e. below 140 cps) can cause spills when a consumer uses the product and/or can give the consumer the perception the product is not premium. As can be seen in Table 4 below, a detergent composition with −30% of a nonionic surfactant has an acceptable pour viscosity of about 379 cps (Test Leg 1) and this viscosity is maintained when a quat biocide is added (Test Leg 2). However, while reducing the level of nonionic or using amine oxide may improve the bacterial performance of a quat biocide, it results in a dramatic viscosity drop. Thus there is a trade off with the utilization of either lower nonionic levels and/or amine oxide to enhance quat biocide activity and the pour viscosity of the product.

TABLE 4

| Test Leg | Nonionic C12-14 EO9 (wt. %) | Nonionic C14-15 EO7 (wt. % ) | Amine Oxide (wt. %) | Quaternary Biocide (wt. %) | Pour Viscosity (cps) | Avg. Log R of *Staphylococcus aureus* and *Klebsiella pneumoniae* |
|---|---|---|---|---|---|---|
| 1 | 29.6 | 0 | 0 | 0 | 379 | −0.1 |
| 2 | 29.6 | 0 | 0 | 1.8 | 400 | −0.5 |
| 5 | 0 | 0 | 14 | 1.8 | 36 | 5.5 |
| 6 | 8 | 0 | 14 | 1.8 | 54 | 5.2 |

TABLE 4-continued

| Test Leg | Nonionic C12-14 EO9 (wt. %) | Nonionic C14-15 EO7 (wt. % ) | Amine Oxide (wt. %) | Quaternary Biocide (wt. %) | Pour Viscosity (cps) | Avg. Log R of *Staphylococcus aureus* and *Klebsiella pneumoniae* |
|---|---|---|---|---|---|---|
| 7 | 0 | 7.6 | 14 | 1.8 | 61 | 3.7 |
| 8 | 0 | 7.6 | 0 | 1.8 | 56 | 1.1 |
| 12 | 8 | 0 | 0 | 1.8 | 91 | 2.9 |

We have surprisingly found that a minimum weight percentage of about 15% nonionic along with an amine oxide will allow a composition to have both a consumer preferred pour viscosity and biocidal activity of the quat biocide. Alternatively, a total compositional weight percent of at least 25% with a combination of nonionic and amine oxide can help a composition to have a consumer preferred pour viscosity. Additional data points for pour viscosity and biocidal activity of a quat biocide are in Table 5.

TABLE 5

| Test Leg | Nonionic C12-14 EO9 | Nonionic C14-15 EO7 | Amine Oxide | Quaternary Biocide | Weight Ratio of AO:NI | Avg. Log R of *Staphylococcus aureus* and *Klebsiella pneumoniae* | Pour Viscosity (cps) |
|---|---|---|---|---|---|---|---|
| A | 10 | 6 | 14 | 1.8 | 0.9:1 | 3.2 | 159 |
| B | 3.5 | 0 | 14 | 1.8 | 4:1 | 3.8 | 84 |
| C | 7.0 | 0 | 14 | 1.8 | 2:1 | 3.1 | 23 |
| D | 20 | 0 | 10 | 1.8 | 1:2 | 3.4 | 151 |
| E | 21 | 0 | 14 | 1.8 | 1:1.5 | 4.0 | 246 |
| F | 5 | 0 | 5 | 1.8 | 1:1 | 4.5 | 12 |
| G | 10 | 0 | 5 | 1.8 | 1:2 | 2.8 | 19 |
| H | 3.5 | 0 | 14 | 1.0 | 4:1 | 3.3 | 18 |
| I | 3.5 | 0 | 14 | 3.0 | 4:1 | 5.5 | 29 |
| J (plus diol) | 20 | 0 | 20 | 2.0 | 1:1 | 4.5 | 1094 |
| K | 20 | 0 | 10 | 3.0 | 1:2 | 4.9 | 146 |
| L | 0 | 7.0 | 14 | 1.8 | 2:1 | 5.0 | 35 |

In line with the above, included herein is a liquid laundry detergent composition, for example, a micellar composition. A laundry detergent composition can comprise a surfactant. A surfactant may include a nonionic surfactant, an amphoteric surfactant, a zwitterionic surfactant, or a combination thereof. A laundry composition is preferably free of anionic surfactant. A laundry detergent composition may comprise from about 8% to about 75%, preferably about 25% to about 75%, by weight of the laundry detergent composition of total surfactant. Each of the nonionic surfactants may be present, for example, at a level of about 1%, 2%, 3%, 4%, 5%, 6%, 7%, 8%, or 9%, to about 5%, 6%, 7%, 8%, 9%, 10%, 12%, 14%, 16%, 18%, 20%, 22%, 24%, 26%, 28%, 30%, 32%, 34%, 36%, 38%, or 40% or any combination thereof, by weight of the composition.

A laundry detergent may comprise, for example, a nonionic surfactant, an amine oxide, and a quat biocide. The ratio by weight of the amine oxide to the nonionic surfactant may be, for example, from about 4:1 to about 1:2.

A nonionic surfactant may comprise an alcohol alkoxylate, an oxo-synthesized alcohol alkoxylate, a Guerbet alcohol alkoxylate, an alkyl phenol alcohol alkoxylate, an alkylpolyglucoside, or a mixture thereof. Preferably, a nonionic surfactant may include, for example, alkoxylated alcohol nonionic surfactants, alkyl polyglucoside nonionic surfactants, and mixtures thereof. Preferably, the alkoxylated alcohol non-ionic surfactant is a linear or branched, primary or secondary alkyl alkoxylated non-ionic surfactant, preferably an alkyl alkoxylated non-ionic surfactant, preferably an alkyl ethoxylated nonionic surfactant, preferably comprising on average from about 9 to about 15, preferably from about 10 to about 16, more preferably from about 12 to about 15, carbon atoms in its alkyl chain; and on average from about 5 to about 12, preferably from about 6 to about 10, most preferably from about 7 to about 8 or from about 9 to about 10, units of ethylene oxide per mole of alcohol. For example, a nonionic surfactant can comprises an ethoxylated nonionic surfactant wherein the ethoxylated nonionic surfactant with an average carbon chain length of about 10 to about 16 comprises an ethoxylated nonionic surfactant with an average carbon chain length of about 12 to about 14 and an average level of ethoxylation of about 9 and a second ethoxylated nonionic surfactant with an average carbon chain length of about 14 to about 15 and an average ethoxylation of about 7.

The nonionic surfactant may have the formula $R(OC_2H_4)_nOH$, wherein R is selected from the group consisting of aliphatic hydrocarbon radicals containing from about 8 to about 16 carbon atoms and can be linear or branched and the average value of n is from about 5 to about 15. For example, the additional nonionic surfactant may be selected from ethoxylated alcohols having an average of about 12-14 carbon atoms in the alcohol (alkyl) portion and an average degree of ethoxylation of about 7-9 moles of ethylene oxide per mole of alcohol.

Additional non limiting examples include ethoxylated alkyl phenols of the formula $R(OC_2H_4)_nOH$, wherein R comprises an alkyl phenyl radicals in which the alkyl groups contain from about 8 to about 12 carbon atoms, and the average value of n is from about 5 to about 15, $C_{12}$-$C_{18}$ alkyl ethoxylates, such as, NEODOL® nonionic surfactants from Shell; $C_{14}$-$C_{22}$ mid-chain branched alcohols; $C_{14}$-$C_{22}$ mid-chain branched alkyl ethoxylates, $BAE_x$, wherein x is from 1 to 30. The nonionic ethoxylated alcohol surfactant herein may further comprise residual alkoxylation catalyst, which may be considered residue from the reaction or an impurity. It may further comprise various impurities or by-products of the alkoxylation reaction. The impurities may vary depending on the catalyst used and the conditions of the reaction. Impurities include alkyl ethers, e.g., dialkyl ethers, such as, didodecyl ether, glycols, e.g., diethylene glycol, triethylene glycol, pentaethylene glycol, other polyethylene glycols.

The nonionic ethoxylated alcohol may be a narrow range ethoxylated alcohol. A narrow range ethoxylated alcohol may have the following general formula (I):

$$R{-}\!\left[OCH_2CH_2\right]_n\!{-}OH \qquad (I)$$

where R is selected from a saturated or unsaturated, linear or branched, $C_{10}$-$C_{16}$ alkyl group and where greater than 90% of n is 0≤n≤15. In addition, the average value of n can be between about 4 to about 14, preferably about 6 to about 10, where less than about 10% by weight of the alcohol ethoxylate are ethoxylates having n<7 and between 10% and about 20% by weight of the alcohol ethoxylate are ethoxylates having n=8.

The composition may comprise an average value of n of about 10. The composition may have the following ranges for each of the following n: n=0 of up to 5%, each of n=1, 2, 3, 4, 5 of up to 2%, n=6 of up to 4%, n=7 of up to 10%, n=8 of between 12% and 20%, n=9 of between 15% and 25%, n=10 of between 15% to 30%, n=11 of between 10% and 20%, n=12 of up to 10%, and n>12 at up to 10%. The composition may have n=9 to 10 of between 30% and 70%. The composition may have greater than 50% of its composition made up of n=8 to 11.

R can be selected from a saturated or unsaturated, linear or branched, C10-C16 alkyl group, where the average value of n is between about 6 and about 10. R can also be selected from a saturated or unsaturated, linear or branched, $C_8$-$C_{16}$ alkyl group, where greater than 90% of n is 0≤n≤15, and where the average value of n between about 5 to about 10, where less than about 20% by weight of the alcohol ethoxylate are ethoxylates having n<8. R can also be selected from a saturated or unsaturated, linear or branched, $C_{10}$-$C_{16}$ alkyl group, where greater than 90% of n is 0≤n≤15, and where the average value of n between about 6 to about 10, where less than about 10% by weight of the alcohol ethoxylate are ethoxylates having n<7 and between 10% and about 20% by weight of the alcohol ethoxylate are ethoxylates having n=8.

The alcohol ethoxylates described herein are typically not single compounds as suggested by their general formula (I), but rather, they comprise a mixture of several homologs having varied polyalkylene oxide chain length and molecular weight. Among the homologs, those with the number of total alkylene oxide units per mole of alcohol closer to the most prevalent alkylene oxide adduct are desirable; homologs whose number of total alkylene oxide units is much lower or much higher than the most prevalent alkylene oxide adduct are less desirable. In other words, a "narrow range" or "peaked" alkoxylated alcohol composition is desirable. A "narrow range" or "peaked" alkoxylated alcohol composition refers to an alkoxylated alcohol composition having a narrow distribution of alkylene oxide addition moles.

A "narrow range" or "peaked" alkoxylated alcohol composition may be desirable for a selected application. Homologs in the selected target distribution range may have the proper lipophilic-hydrophilic balance for a selected application. For example, in the case of an ethoxylated alcohol product comprising an average ratio of 5 ethylene oxide (EO) units per molecule, homologs having a desired lipophilic-hydrophilic balance may range from 2EO to 9EO. Homologs with shorter EO chain length (<2EO) or longer EO chain length (>9EO) may not be desirable for the applications for which a=5 EO/alcohol ratio surfactant is ordinarily selected since such longer and shorter homologs are either too lipophilic or too hydrophilic for the applications utilizing this product. Therefore, it is advantageous to develop an alkoxylated alcohol having a peaked distribution.

The narrow range alkoxylated alcohol compositions of the disclosure may have an average degree of ethoxylation ranging from about 0 to about 15, such as, for example, ranging from about 4 to about 14, from about 5-10, from about 8-11, and from about 6-9. The narrow range alkoxylated alcohol compositions of the disclosure may have an average degree of ethoxylation of 10. The narrow range alkoxylated alcohol compositions of the disclosure may have an average degree of ethoxylation of 9. The narrow range alkoxylated alcohol compositions of the disclosure may have an average degree of ethoxylation of 5.

The alkyl polyglucoside surfactant can be selected from C10-C16 alkyl polyglucoside surfactant. The alkyl polyglucoside surfactant can have a number average degree of polymerization of from 0.1 to 3.0, preferably from 1.0 to 2.0, more preferably from 1.2 to 1.6. The alkyl polyglucoside surfactant can comprise a blend of short chain alkyl polyglucoside surfactant having an alkyl chain comprising 10 carbon atoms or less, and mid to long chain alkyl polyglucoside surfactant having an alkyl chain comprising greater than 10 carbon atoms to 18 carbon atoms, preferably from 12 to 14 carbon atoms.

Short chain alkyl polyglucoside surfactants have a monomodal chain length distribution between C8-C10, mid to long chain alkyl polyglucoside surfactants have a monomodal chain length distribution between C10-C18, while mid chain alkyl polyglucoside surfactants have a monomodal chain length distribution between C12-C14. In contrast, C8 to C18 alkyl polyglucoside surfactants typically have a monomodal distribution of alkyl chains between C8 and C18, as with C8 to C16 and the like. As such, a combination of short chain alkyl polyglucoside surfactants with mid to long chain or mid chain alkyl polyglucoside surfactants have a broader distribution of chain lengths, or even a bimodal distribution, than non-blended C8 to C18 alkyl polyglucoside surfactants. Preferably, the weight ratio of short chain alkyl polyglucoside surfactant to long chain alkyl polyglucoside surfactant is from 1:1 to 10:1, preferably from 1.5:1 to 5:1, more preferably from 2:1 to 4:1. It has been found that a blend of such short chain alkyl polyglucoside surfactant and long chain alkyl polyglucoside surfactant results in faster dissolution of the detergent solution in water and improved initial sudsing, in combination with improved suds stability.

C10-C16 alkyl polyglucosides are commercially available from several suppliers (e.g., Simusol® surfactants from Seppic Corporation; and Glucopon® 600 CSUP, Glucopon® 650 EC, Glucopon® 600 CSUP/MB, and Glucopon® 650 EC/MB, from BASF Corporation). Glucopon® 215UP is a preferred short chain APG surfactant. Glucopon® 600CSUP is a preferred mid to long chain APG surfactant.

The composition may also be substantially free of or free of additional nonionic surfactants. Substantially free of means about 1% or less, while free of means the material is not deliberately added, but may come in as part of another ingredient.

The composition may further include an amine oxide. The amine oxide may include for example, a C10-C16 alkyl dimethyl amine oxide, an amido propyl dimethyl amine oxide, or a combination thereof. The amine oxide may be present at an active level of about 3% to about 30%, from about 3% to about 25%, from about 3% to about 25%, from about 5% to about 25%, from about 5% to about 20%, from about 7% to about 25%, from about 7% to about 20%, from about 10% to about 20%, from about 7% to about 14%, from about 12% to about 28%, from about 13% to about 26%, from about 13% to about 15%, from about 20% to about 26%, from about 5% to about 9%, from about 12% to about 16%, about 14%, about 21%, or about 25.5% by weight of the composition.

The amine oxide may comprise a coco dimethyl amine oxide. An amine oxide may have a linear or mid-branched alkyl moiety. Typical linear amine oxides include water-soluble amine oxides containing one R1 C8-18 alkyl moiety and 2 R2 and R3 moieties selected from the group consisting of C1-3 alkyl groups and C1-3 hydroxyalkyl groups. Preferably amine oxide is characterized by the formula R1-N (R2)(R3) O wherein R1 is a C8-18 alkyl and R2 and R3 are selected from the group consisting of methyl, ethyl, propyl, isopropyl, 2-hydroxethyl, 2-hydroxypropyl and 3-hydroxypropyl. The amine oxide may include alkylamidopropylamine oxide, wherein an amidopropyl group is inserted between the R1 and N of the prior formula, for example:

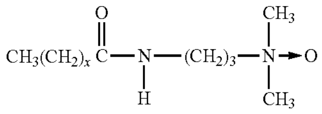

68155-09-9

Cocoamidopropylamine Oxide

X = 6 to 16

The linear amine oxide surfactants in particular may include linear C10-C18 alkyl dimethyl amine oxides and linear C8-C12 alkoxy ethyl dihydroxy ethyl amine oxides. Preferred amine oxides include linear C10, linear C10-C12, linear C12-C14 alkyl dimethyl amine oxides, and C10-C16 alkyl dimethyl amine oxides, for example, a lauryl dimethyl amine oxide. As used herein “mid-branched” means that the amine oxide has one alkyl moiety having n1 carbon atoms with one alkyl branch on the alkyl moiety having n2 carbon atoms. The alkyl branch is located on the α carbon from the nitrogen on the alkyl moiety. This type of branching for the amine oxide is also known in the art as an internal amine oxide.

The composition may further include an additional amphoteric surfactant and/or zwitterionic surfactant. The composition may include from about 0.1% to about 15%, about 0.1% to about 10%, about 0.2% to about 10%, about 0.5% to about 10%, from about 1% to about 8%, from about 1% to about 5%, by weight of the composition of an amphoteric and/or zwitterionic surfactant. Suitable amphoteric and/or zwitterionic surfactants can include betaines, such as alkyl betaines, alkylamidobetaine, amidazoliniumbetaine, sulfobetaine (INCI Sultaines), as well as phosphobetaines, or combinations thereof.

A laundry detergent composition may include from about 0.5% to about 5.0% of a quat biocide. Additionally, the quat biocide may be present at an active level of about 1% to about 4%, about 1% to about 3.5%, about 1% to about 3%, about 1.25% to about 2.75%, about 1.5% to about 2.5%, or about 1.8%, by weight of the composition. A quat biocide may comprise a benzalkonium chloride, a benzalkonium bromide, or a combination thereof. A quat biocide may comprise a quaternary ammonium salt biocide. A quaternary ammonium salt biocide may comprise a dialkyl dimethyl quaternary ammonium salt biocide. The dialkyl dimethyl quaternary ammonium salt biocide may include an anion. The anion may comprise, for example, chloride, bromide, acetate, borate, propionate, carbonate, bicarbonate, hydroxide, or a combination thereof. The anion may be a halide. The halide can include bromide and/or chloride.

The dialkyl dimethyl quaternary ammonium salt biocide may comprise di-n-decyldimethylammonium chloride, dioctyldimethylammonium chloride, octyl decyl dimethylammonium chloride, di-n-decyldimethylammonium bromide, dioctyldimethylammonium bromide, octyl decyl dimethylammonium bromide, or a combination thereof. The dialkyl dimethyl quaternary ammonium salt biocide may be a combination of octyl decyl dimethyl ammonium chloride, dioctyl dimethyl ammonium chloride, and didecyl dimethyl ammonium chloride. The combination of octyl decyl dimethyl ammonium chloride, dioctyl dimethyl ammonium chloride, and didecyl dimethyl ammonium chloride may have a ratio by weight of about 2.5 (octyl decyl dimethyl ammonium chloride):about 1.0 (dioctyl dimethyl ammonium chloride):about 1.5 (didecyl dimethyl ammonium chloride). The dialkyl dimethyl quaternary ammonium salt biocide may be Bardac® 2050 and/or Bardac® 2080 available from Arxada, Inc (previously dba Lonza, Inc.).

The composition may further include a laundry detergent adjunct. One or more laundry detergent adjunct ingredients can be included in a composition at a level by weight, for example, of about 0.001% to about 50%. Adjunct ingredients can include, for example, color care agents; organic solvents; aesthetic dyes; hueing dyes; leuco dyes; opacifiers such as those commercially available under the Acusol tradename, brighteners including FWA49, FWA15, and FWA36; dye transfer inhibitors including PVNO, PVP and PVPVI dye transfer inhibitors; builders including, for example, citric acid; chelants; enzymes; perfume, perfume capsules; preservatives; antioxidants including sulfite salts such as potassium sulphite or potassium bisulphite salts and those commercially available under the Ralox brand name; antibacterial and anti-viral agents including 4.4'-dichloro 2-hydroxydiphenyl ether such as Tinosan HP100 available from the BASF company; anti-mite actives such as benzyl benzoate; structuring agents including hydrogenated castor oil; silicone based anti-foam materials; electrolytes including inorganic electrolytes such as sodium chloride, potassium chloride, magnesium chloride, and calcium chloride, and related sodium, potassium, magnesium and calcium sulphate salts, as well as organic electrolytes such as sodium, potassium, magnesium and calcium salts of carbonate, bicarbonate, carboxylates such as formate, citrate and acetate; borates, such as borax or sodium tetra borate; pH trimming agents including sodium hydroxide, hydrogen chloride, sulfuric acid, and alkanolamines including monoethanolamine, diethanolamine, triethanolamine, and monoisopropanolamine; a probiotic; zinc ricinoleate, thymol, polyethylenimines (such as Lupasol® from BASF) and zinc complexes thereof, silver and silver compounds, a cationic biocide including octyl decyl dimethyl ammonium chloride, dioctyl dimethyl ammonium chloride, didecyl dimethyl ammonium chloride, dispersant, cleaning polymer, glucan, or a mixture thereof. For example, the detergent adjunct comprises an enzyme, an enzyme stabilizer, a builder, a hueing agent, soil release polymer, anti-soil redeposition agent, a bleach, or a combination thereof.

The organic solvent can include an alcohol and/or a polyol. For example, the organic solvent can comprise ethanol, propanol, isopropanol, a sugar alcohol, a glycol, a glycol ether, glycerin, or a combination thereof. The organic solvent can comprise polyethylene glycol, especially low molecular weight polyethylene glycols such as PEG 200 and PEG 400; diethylene glycol; glycerol; 1,2-propanediol; polypropylene glycol including dipropylene glycol and tripropylene glycol and low molecular weight polypropylene glycols such as PPG400; or a mixture thereof.

The chelant can comprise, for example, EDDS, HEDP, GLDA, DTPA, DTPMP, DETA, EDTA, MGDA, Disodium 4,5-dihydroxybenzene-1,3-disulfonate [Tiron] or a mixture thereof. The chelant can be biodegradable. Biodegradable chelants can include, for example, GLDA, NTA, IDS, EDDG, EDDM, HIDS, HEIDA, HEDTA, DETA, or a combination thereof.

The enzyme can comprise, for example, protease, amylase, cellulase, mannanase, lipase, xyloglucanase, pectate lyase, nuclease enzyme, phosphodiesterase, or a mixture thereof.

Cleaning polymers can include, for example, those which can help clean stains or soils on clothing and/or help prevent those soils from redepositing on clothing during the wash. Examples are optionally modified polyglucans, poly(vinylpyrrolidone), poly (ethylene glycol), poly(vinyl alcohol), poly(vinylpyridine-N-oxide), poly(vinylimidazole), or a combination thereof.

The composition may comprise one or more amphiphilic cleaning polymers. Such polymers have balanced hydrophilic and hydrophobic properties such that they remove grease particles from fabrics and surfaces. Suitable amphiphilic alkoxylated grease cleaning polymers comprise a core structure and a plurality of alkoxylate groups attached to that core structure. These may comprise alkoxylated polyalkylenimines, especially ethoxylated polyethylene imines or polyethyleneimines having an inner polyethylene oxide block and an outer polypropylene oxide block. Typically, these may be incorporated into the compositions of the invention in amounts of from 0.005 to 10 wt %, generally from 0.5 to 8 wt %.

The composition may comprise, for example, a thickener. The composition may include from about 0.1% to about 10%, from about 0.5% to about 9%, from about 1% to about 8%, from about 1% to about 7%, from about 1% to about 6%, from about 1% to about 5%, from about 1% to about 4%, from about 2% to about 4%, by weight of the composition of a thickener. The thickener may include, for example, a PEG-120 methyl glucose dioleate, PEG-120 methyl glucose trioleate, hydrogenated castor oil, or a combination thereof. Commercial thickeners can include, for example, Antil® 127 MB available from Evonik, Glucamate™ LT and Glucamate™ VLT available from Lubrizol.

Water

The laundry detergent composition may also include water. Water can be present, for example, at a level of about 5% to about 95%, by weight of the composition. The water may be included at a level of about 10% to about 90%. In addition, the composition can include from about 25% to about 90%, from about 30% to about 90%, from about 40% to about 90%, from about 50% to about 90%, from about 60% to about 90%, from about 70% to about 90%, or from about 75% to about 90%, by weight of the composition of water.

pH

The composition may have a pH of about 5.0 to about 12, preferably 6.0-10.0, more preferably from 8.0 to 10. wherein the pH of the composition is measured as a 10% dilution in demineralized water at 20° C.

Viscosity

A liquid detergent composition can have a pour viscosity from 140 to 1500 centipoises (140-1500 mPa*s), more preferably from 150 to 1000 centipoises (150-1000 mPa*s), and most preferably from 200 to 600 centipoises (200-600 mPa*s) at 20/s and 21° C. Pour viscosity can be determined by conventional methods. For example, pour viscosity may be measured using an AR 550 rheometer from TA instruments using a plate steel spindle at 40 mm diameter and a gap size of 500 μm at a shear of 20/s. The pour viscosity measured at 20/s and can be obtained from a logarithmic shear rate sweep from 0.1-1 to 25-1 in 3 minutes time at 21° C. The preferred rheology described herein may be achieved using internal existing structuring with detergent ingredients and/or by employing an external rheology modifier.

Composition Making

The liquid laundry detergent compositions can be prepared, for example, by combining the components thereof in any convenient order and by mixing, e.g., agitating, the resulting combination to form a phase stable liquid laundry composition. For example, an amine oxide, nonionic surfactant(s), and any additional surfactants can be mixed together followed by a quat, solvent, and water. Next, any chelant may be added followed by a buffering system (like MEA, citric acid, etc.), enzymes, perfume, and dye. After addition of all of the composition components, agitation of the mixture is continued for a period of time sufficient to form compositions having the requisite viscosity and phase stability characteristics. Frequently this will involve agitation for a period from about 30 to 60 minutes.

Methods of Enhancing Biocidal Impact

Also included herein are methods of enhancing biocidal impact of the quaternary ammonium salt. The quaternary ammonium salt is considered to have an enhanced biocidal impact in a composition if the bacterial log reduction measured on a composition containing the combination of the nonionic surfactant, amine oxide, and quat biocide (target composition) provides a larger bacterial reduction than that measured on the same composition minus the amine oxide (control). The amount of amine oxide in the target composition is replaced with water for the measurement. Again, without being limited by theory, it is believed any increase in biocidal activity of a quaternary ammonium salt in the presence of amine oxide is due, at least in part, to the amine oxide freeing the quat biocide from the micelles of the nonionic surfactant making the quat biocide more available to the target bacteria.

To measure the log reduction (Log R), the target composition and control can be tested in accordance with ASTM E2406-16. As described in the method, the biocidal impact may be measured on a fabric or in wash water. Here, we are measuring on fabric in a simulated wash cycle where the laundry composition is added during the wash cycle as described in ASTM E2406-16. The method leaves the water:fabric ratio undefined. Here, the water:fabric ratio may be about 2.5:1 by weight. The wash water can be at a temperature of about 20° C. The target and control composition can be dosed at 175 g/18.9 L of water in the wash cycle. The wash cycle time can be about 16 minutes.

Moreover, a target bacteria needs to be selected for which the biocidal impact will be measured. For this application, the Log R can be measured on *Klebsiella pneumoniae*, *Staphylococcus aureus*, or a combination thereof. Where noted, the average Log R is the average of the biocidal impact which is separately measured on both *Klebsiella pneumoniae* and *Staphylococcus aureus*.

A method for enhancing biocidal impact of a dialkyl dimethyl quaternary ammonium salt in a micellar laundry detergent composition comprising the dialkyl dimethyl quaternary ammonium salt and a nonionic surfactant with an average carbon chain length of about 10 to about 16, comprising adding to the laundry composition amine oxide, so that it is in a weight ratio with the alkoxylated nonionic surfactant of about 4:1 to about 1:2. The micellar laundry detergent may include all of the components and levels as discussed above, but a few specific scenarios are discussed below.

As part of the method, the micellar laundry detergent composition may comprise, from example, from about 5% to about 30%, by weight, of the nonionic surfactant, preferably an alkoxylated nonionic surfactant. The average biocidal impact of the dialkyl dimethyl quaternary ammonium salt in the micellar laundry detergent composition can be an average Log R of 2.8 or more. The dialkyl dimethyl quaternary ammonium salt may comprise di-n-decyldimethylammonium chloride, dioctyldimethylammonium chloride, octyl decyl dimethylammonium chloride, di-n-decyldimethylammonium bromide, dioctyldimethylammonium bromide, octyl decyl dimethylammonium bromide, or a combination thereof. The alkoxylated nonionic surfactant with an average carbon chain length of about 10 to about 16 may comprise an average level of ethoxylation of about 6 to about 10.

An enhanced biocidal impact can be measured as the average Log R of the target and control composition on a gram negative bacteria and a gram positive bacteria. The gram negative bacteria can comprise *Klebsiella pneumoniae*. The gram positive bacteria can comprise *Staphylococcus aureus*. An enhanced biocidal impact can be measured on a combination of *Staphylococcus aureus* and *Klebsiella pneumoniae*. The average Log R of a micellar laundry detergent composition comprising the dialkyl dimethyl quaternary ammonium salt and an alkoxylated nonionic surfactant with an average carbon chain length of about 11 to about 16 and the amine oxide is about 0.5 Log R, about 1 Log R, about 1.25 Log R, about 1.5 Log R, about 1.75 Log R, about 2.0 Log R, and 2.25 Log R, about 2.5 Log R, or about 3.0 Log R better than a micellar laundry detergent composition comprising the dialkyl dimethyl quaternary ammonium salt and an alkoxylated nonionic surfactant with an average carbon chain length of about 11 to about 16 without amine oxide.

Example Laundry Detergent Compositions

Inventive Laundry Detergent Compositions

| | Comp. 1 | Comp. 2 | Comp. 3 | Comp. 4 | Comp. 5 |
|---|---|---|---|---|---|
| Quat biocide[1] | 1.80 | 1.80 | 1.8 | 1.8 | 1.8 |
| C12-14 EO9 nonionic[2] | 8.00 | 8.00 | 10.0 | 3.5 | 7.0 |
| C 14-15 EO7 nonionic[3] | 7.60 | 7.60 | 6.0 | 0 | 0 |
| Monoethanolamine[4] | 2.00 | 2.00 | 2.0 | 2.0 | 2.0 |
| perfume | 0.50 | — | 0.5 | 0.5 | 0.5 |

-continued

Inventive Laundry Detergent Compositions

| | | | | | |
|---|---|---|---|---|---|
| Dye | 0.008 | — | 0.008 | 0.008 | 0.008 |
| Chelant | 1.20 | 1.20 | 1.18 | 1.18 | 1.18 |
| Glycerin | 3.5 | 3.5 | 3.0 | 3.0 | 3.0 |
| Propane 1,2-diol | 4.5 | 4.5 | 3.35 | 3.35 | 3.35 |
| C10-C16 alkyl dimethyl amine oxide[5] | 14.00 | 14.00 | 14.00 | 14.00 | 14.00 |
| Enzymes and Brighteners | 1.189 | 1.189 | 0.297 | 0.297 | 0.297 |
| Citric Acid | 3.0 | 3.0 | 1.5 | 1.5 | 1.5 |
| buffer | 0.30 | 0.30 | 0.30 | 0.30 | 0.30 |
| Water | QS | QS | QS | QS | QS |
| pH | ~8.9 | ~8.9 | ~8.9 | ~8.9 | ~8.9 |

| | Comp. 6 | Comp. 7 | Comp. 8 | Comp. 9 | Comp. 10 |
|---|---|---|---|---|---|
| Quat biocide[1] | 1.8 | 1.8 | 1.8 | 1.8 | 1.0 |
| C12-14 EO9 nonionic[2] | 20.00 | 21.00 | 5.00 | 10.00 | 3.50 |
| C 14-15 EO7 nonionic[3] | — | — | — | — | — |
| Monoethanolamine[4] | 2.0 | 2.0 | 2.0 | 2.0 | 2.0 |
| perfume | 0.5 | 0.5 | 0.5 | 0.5 | 0.5 |
| Dye | 0.008 | 0.008 | 0.008 | 0.008 | 0.008 |
| Chelant | 1.18 | 1.18 | 1.18 | 1.18 | 1.18 |
| Glycerin | 3.0 | 3.0 | 3.0 | 3.0 | 3.0 |
| Propane 1,2-diol | 3.35 | 3.35 | 3.35 | 3.35 | 3.35 |
| C10-C16 alkyl dimethyl amine oxide[5] | 10.00 | 14.00 | 5.00 | 5.00 | 14.00 |
| Enzymes and Brighteners | 0.297 | 0.297 | 0.297 | 0.297 | 0.297 |
| Citric Acid | 1.5 | 1.5 | 1.5 | 1.5 | 1.5 |
| buffer | 0.30 | 0.30 | 0.30 | 0.30 | 0.30 |
| Water | QS | QS | QS | QS | QS |
| pH | ~8.9 | ~8.9 | ~8.9 | ~8.9 | ~8.9 |

| | Comp. 11 | Comp. 12 | Comp. 13 | Comp. 14 |
|---|---|---|---|---|
| Quat biocide[1] | 3.0 | 2.0 | 3.0 | 1.8 |
| C12-14 EO9 nonionic[2] | 3.50 | 20.00 | 20.00 | — |
| C 14-15 EO7 nonionic[3] | — | — | — | 7.00 |
| Monoethanolamine | 2.0 | 2.0 | 2.0 | 2.0 |
| perfume | 0.5 | 0.5 | 0.5 | 0.5 |
| Dye | 0.008 | 0.008 | 0.008 | 0.008 |
| Chelant | 1.18 | 1.18 | 1.18 | 1.18 |
| Glycerin | 3.0 | 3.0 | 3.0 | 3.0 |
| Propane 1,2-diol | 3.35 | 3.35 | 3.35 | 3.35 |
| C10-C16 alkyl dimethyl amine oxide[4] | 14.00 | 20.00 | 10.00 | 14.00 |
| Enzymes and Brighteners | 0.297 | 0.297 | 0.297 | 0.297 |
| Citric Acid | 1.5 | 1.5 | 1.5 | 1.5 |
| buffer | 0.30 | 0.30 | 0.30 | 0.30 |
| Water | QS | QS | QS | QS |
| pH | ~8.9 | ~8.9 | ~8.9 | ~8.9 |

[1]Bardac ® 2080 available from Arxada
[2]Alfonic 24-9 available from Sasol
[3]Neodol ® 45-7 available from Shell
[4]Ziegler Natural Amine Oxide; Lauryl dimethyl Amine Oxide available from Procter and Gamble

TESTED COMPOSITIONS

| | Test Leg 1 | Test Leg 14 | Test Leg 2 | Test Leg 9 | Test Leg 5 |
|---|---|---|---|---|---|
| Quat biocide[1] | — | — | 1.8 | 1.8 | 1.8 |
| C12-14 EO9 nonionic[2] | 29.6 | 8.0 | 29.6 | 8.0 | — |
| C 14-15 EO7 nonionic[3] | — | 7.6 | — | 7.6 | — |
| Monoethanolamine | 2.0 | 2.0 | 2.0 | 2.0 | 2.0 |
| perfume | 0.5 | 0.5 | 0.5 | 0.5 | 0.5 |
| Dye | 0.008 | 0.008 | 0.008 | 0.008 | 0.008 |
| Chelant | 1.18 | 1.18 | 1.18 | 1.18 | 1.18 |
| Glycerin | 3.5 | 3.5 | 3.5 | 3.5 | 3.5 |

-continued

| TESTED COMPOSITIONS | | | | | |
|---|---|---|---|---|---|
| Propane 1,2-diol | 4.5 | 4.5 | 4.5 | 4.5 | 4.5 |
| C10-C16 alkyl dimethyl amine oxide[4] | — | — | — | — | 14 |
| Enzymes and Brighteners | 0.153 | 0.153 | 0.153 | 0.153 | 0.153 |
| Citric Acid | 1.5 | 1.5 | 1.5 | 1.5 | 1.5 |
| buffer | 0.3 | 0.3 | 0.3 | 0.3 | 0.3 |
| Water | QS | QS | QS | QS | QS |
| pH | ~8.9 | ~8.9 | ~8.9 | ~8.9 | ~8.9 |
| Log R of average bacterial kill | −0.1 | −0.2 | −0.5 | 1.1 | 5.5 |
| Pour viscosity (cps) | 379 | 136 | 400 | n/a | 36 |
| Dust sebum SRI | 50.5 | 34.3 | 52 | 30.9 | 45.5 |

| | Test Leg 4 | Test Leg 3 | Test Leg 6 | Test Leg 7 |
|---|---|---|---|---|
| Quat biocide[1] | 1.8 | — | 1.8 | 1.8 |
| C12-14 EO9 nonionic[2] | 8.0 | 8.0 | 8.0 | — |
| C 14-15 EO7 nonionic[3] | 7.6 | 7.6 | — | 7.6 |
| Monoethanolamine | 2.0 | 2.0 | 2.0 | 2.0 |
| perfume | 0.5 | 0.5 | 0.5 | 0.5 |
| Dye | 0.008 | 0.008 | 0.008 | 0.008 |
| Chelant | 1.18 | 1.18 | 1.18 | 1.18 |
| Glycerin | 3.5 | 3.5 | 3.5 | 3.5 |
| Propane 1,2-diol | 4.5 | 4.5 | 4.5 | 4.5 |
| C10-C16 alkyl dimethyl amine oxide[4] | 14 | 14 | 14 | 14 |
| Enzymes and Brighteners | 0.153 | 0.153 | 0.153 | 0.153 |
| Citric Acid | 1.5 | 1.5 | 1.5 | 1.5 |
| buffer | 0.3 | 0.3 | 0.3 | 0.3 |
| Water | QS | QS | QS | QS |
| pH | ~8.9 | ~8.9 | ~8.9 | ~8.9 |
| Log R of average bacterial kill | 3.8 | 0.9 | 5.2 | 3.7 |
| Pour viscosity (cps) | 219 | 284 | 54 | 61 |
| Dust Sebum SRI | 51.3 | 51.4 | 45.2 | 46.1 |

| | Test Leg 8 | Test Leg 12 | Test Leg A | Test Leg B | Test Leg C |
|---|---|---|---|---|---|
| Quat biocide[1] | 1.8 | 1.8 | 1.8 | 1.8 | 1.8 |
| C12-14 EO9 nonionic[2] | — | 8.0 | 10 | 3.5 | 7.0 |
| C 14-15 EO7 nonionic[3] | 7.6 | — | 6.0 | — | — |
| Monoethanolamine | 2.0 | 2.0 | 2.0 | 2.0 | 2.0 |
| perfume | 0.5 | 0.5 | 0.5 | 0.5 | 0.5 |
| Dye | 0.008 | 0.008 | 0.008 | 0.008 | 0.008 |
| Chelant | 1.18 | 1.18 | 1.18 | 1.18 | 1.18 |
| Glycerin | 3.5 | 3.5 | 3.5 | 3.5 | 3.5 |
| Propane 1,2-diol | 4.5 | 4.5 | 4.5 | 4.5 | 4.5 |
| C10-C16 alkyl dimethyl amine oxide[4] | — | — | 14 | 14 | 14 |
| Enzymes and Brighteners | 0.153 | 0.153 | 0.153 | 0.153 | 0.153 |
| Citric Acid | 1.5 | 1.5 | 1.5 | 1.5 | 1.5 |
| buffer | 0.3 | 0.3 | 0.3 | 0.3 | 0.3 |
| Water | QS | QS | QS | QS | QS |
| pH | ~8.9 | ~8.9 | ~8.9 | ~8.9 | ~8.9 |
| Log R of average bacterial kill | 1.1 | 2.9 | 3.2 | 3.8 | 3.1 |
| Pour viscosity (cps) | 56 | 91 | 159 | 84 | 23 |
| Dust sebum SRI | 21.8 | 15.8 | n/a | n/a | n/a |
| Weight ratio of amine oxide to nonionic | — | — | 0.9:1 | 4:1 | 2:1 |

| | Test Leg D | Test Leg E | Test Leg F | Test Leg G | Test Leg H |
|---|---|---|---|---|---|
| Quat biocide[1] | 1.8 | 1.8 | 1.8 | 1.8 | 1.0 |
| C12-14 EO9 nonionic[2] | 20 | 21 | 5 | 10 | 3.5 |
| C 14-15 EO7 nonionic[3] | — | — | — | — | — |
| Monoethanolamine | 2.0 | 2.0 | 2.0 | 2.0 | 2.0 |
| perfume | 0.5 | 0.5 | 0.5 | 0.5 | 0.5 |
| Dye | 0.008 | 0.008 | 0.008 | 0.008 | 0.008 |
| Chelant | 1.18 | 1.18 | 1.18 | 1.18 | 1.18 |
| Glycerin | 3.5 | 3.5 | 3.5 | 3.5 | 3.5 |

-continued

| TESTED COMPOSITIONS | | | | | |
|---|---|---|---|---|---|
| Propane 1,2-diol | 4.5 | 4.5 | 4.5 | 4.5 | 4.5 |
| C10-C16 alkyl dimethyl amine oxide[4] | 10 | 14 | 5 | 5 | 14 |
| Enzymes and Brighteners | 0.153 | 0.153 | 0.153 | 0.153 | 0.153 |
| Citric Acid | 1.5 | 1.5 | 1.5 | 1.5 | 1.5 |
| buffer | 0.3 | 0.3 | 0.3 | 0.3 | 0.3 |
| Water | QS | QS | QS | QS | QS |
| pH | ~8.9 | ~8.9 | ~8.9 | ~8.9 | ~8.9 |
| Log R of average bacterial kill | 3.4 | 4.0 | 4.5 | 2.8 | 3.3 |
| Pour viscosity (cps) | 151 | 246 | 12 | 19 | 18 |
| Weight ratio of amine oxide to nonionic | 1:2 | 1:1.5 | 1:1 | 1:2 | 4:1 |

| | Test Leg I | Test Leg J | Test Leg K | Test Leg L |
|---|---|---|---|---|
| Quat biocide[1] | 3.0 | 2.0 | 3.0 | 1.8 |
| C12-14 EO9 nonionic[2] | 3.5 | 20 | 20 | — |
| C 14-15 EO7 nonionic[3] | — | — | — | 7.0 |
| Monoethanolamine | 2.0 | 2.0 | 2.0 | 2.0 |
| perfume | 0.5 | 0.5 | 0.5 | 0.5 |
| Dye | 0.008 | 0.008 | 0.008 | 0.008 |
| Chelant | 1.18 | 1.18 | 1.18 | 1.18 |
| Glycerin | 3.5 | 0.29 | 3.5 | 3.5 |
| Propane 1,2-diol | 4.5 | 3.29 | 4.5 | 4.5 |
| C10-C16 alkyl dimethyl amine oxide[4] | 14 | 20 | 10 | 14 |
| Enzymes and Brighteners | 0.153 | 0.153 | 0.153 | 0.153 |
| Citric Acid | 1.5 | 1.5 | 1.5 | 1.5 |
| buffer | 0.3 | 0.3 | 0.3 | 0.3 |
| Water | QS | QS | QS | QS |
| pH | ~8.9 | ~8.9 | ~8.9 | ~8.9 |
| Log R of average bacterial kill | 5.5 | 4.5 | 4.9 | 5.0 |
| Pour viscosity (cps) | 29 | 1094 | 146 | 35 |
| Weight ratio of amine oxide to nonionic | 4:1 | 1:1 | 1:2 | 2:1 |

The above inventive and tested laundry detergent formulations may be prepared by the composition method of making listed above.

Combinations

1) A laundry composition, comprising: a) about 3% to about 40%, by weight of the composition, of an alcohol alkoxylated nonionic surfactant; b) an amine oxide; c) about 0.5% to about 3%, by weight of the composition, of a quaternary ammonium salt biocide; and d) a laundry detergent adjunct, optionally comprising an enzyme, a brightener, or a combination thereof; wherein the ratio by weight of the amine oxide to the nonionic surfactant is from about 4:1 to about 1:2, and the composition has micelles.

2) The laundry composition of 1, wherein the composition is free of anionic surfactant and the micelles are mixed micelles.

3) The laundry composition of 1 or 2, wherein the composition comprises from about 5% to about 30%, by weight, of the alcohol alkoxylated nonionic surfactant.

4) The laundry composition of any one of 1-3, wherein the composition comprises from about 5% to about 20%, by weight, of the amine oxide.

5) The laundry composition of any one of 1-4, wherein the quaternary ammonium salt biocide comprises a dialkyl dimethyl quaternary ammonium salt.

6) The laundry composition of 5, wherein the dialkyl dimethyl quaternary ammonium salt comprises di-n-decyldimethylammonium chloride, dioctyldimethylammonium chloride, octyl decyl dimethylammonium chloride, di-n-decyldimethylammonium bromide, dioctyldimethylammonium bromide, octyl decyl dimethylammonium bromide, or a combination thereof.

7) The laundry composition of any one of 1-6, wherein the alcohol alkoxylated nonionic surfactant comprises an average carbon chain length of about 10 to about 16 is ethoxylated, and has an average level of ethoxylation of about 6 to about 10.

8) The laundry composition of 7, further comprising from about 1% to about 2% by weight of the composition of a chelant, preferably comprising tetrasodium glutamate diacetate.

9) A laundry detergent composition, comprising: a) from about 25% to about 75%, by weight of the composition of total surfactant, comprising; i) an amine oxide, and ii) from about 3% to about 40%, by weight of the composition, of an ethoxylated nonionic surfactant with an average carbon chain length of about 10 to about 16; b) from about 0.5% to about 3.0%, by weight of the composition, of a quaternary ammonium salt biocide; and c) a laundry detergent adjunct; wherein the composition has a pour viscosity of about 140 to about 1500 cps, wherein the ratio by weight of the amine oxide to the nonionic surfactant is from about 4:1 to about 1:2, and the composition has micelles.

10) The laundry detergent composition of 9, wherein the ethoxylated nonionic surfactant with an average carbon chain length of about 10 to about 16 comprises an ethoxylated nonionic surfactant with an average carbon chain length of about 12 to about 14 and an average level of ethoxylation of about 9 and a second ethoxylated nonionic surfactant with an average carbon chain length of about 14 to about 15 and an average ethoxylation of about 7.

11) The laundry detergent composition of any one of 9-10, wherein the composition comprises from about 10% to about 20%, by weight, of the amine oxide.

12) The laundry detergent composition of any one of 9-11, wherein the composition comprises from about 8% to about 20%, by weight, of the ethoxylated nonionic surfactant with an average carbon chain length of about 12 to about 15.

13) A method of enhancing biocidal impact of a dialkyl dimethyl quaternary ammonium salt in a micellar laundry detergent composition comprising the dialkyl dimethyl quaternary ammonium salt and an alkoxylated nonionic surfactant with an average carbon chain length of about 11 to about 16, comprising adding to the laundry composition amine oxide, so that it is in a weight ratio with the alkoxylated nonionic surfactant of about 4:1 to about 1:2.

14) The method of 13, wherein the laundry detergent composition comprises from about 5% to about 30%, by weight of the composition, of the alkoxylated nonionic surfactant.

15) The method of any one of 13-14, wherein the enhanced biocidal impact is on a combination of *Staphylococcus aureus* and *Klebsiella pneumoniae.*

16) The method of any one of 13-15, wherein the average biocidal impact of the dialkyl dimethyl quaternary ammonium salt in the micellar laundry detergent composition is log 2.8 or more.

17) The method of any one of 13-16, wherein the dialkyl dimethyl quaternary ammonium salt comprises di-n-decyldimethylammonium chloride, dioctyldimethylammonium chloride, octyl decyl dimethylammonium chloride, di-n-decyldimethylammonium bromide, dioctyldimethylammonium bromide, octyl decyl dimethylammonium bromide, or a combination thereof.

18) The method of any one of 13-17, wherein the alkoxylated nonionic surfactant with an average carbon chain length of about 10 to about 16 comprises an average level of ethoxylation of about 6 to about 10.

19) The method of any one of 13-18, wherein the enhanced biocidal impact is on combination of *Staphylococcus aureus* and *Klebsiella pneumoniae* and is measured as the average Log R.

20) The method of any of 13-19, wherein the average Log R of the dialkyl dimethyl quaternary ammonium salt in the micellar laundry detergent composition comprising the dialkyl dimethyl quaternary ammonium salt and an alkoxylated nonionic surfactant with an average carbon chain length of about 11 to about 16 and the amine oxide is about 1 Log R better than the micellar laundry detergent composition comprising the dialkyl dimethyl quaternary ammonium salt and an alkoxylated alcohol nonionic surfactant with an average carbon chain length of about 11 to about 16 with water substituted for the amine oxide.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A laundry composition consisting of:

a) about 3 wt % to about 40 wt % of an alkoxylated alcohol nonionic surfactant;

b) an amine oxide;

c) about 0.5 wt % to about 3 wt % of a quaternary ammonium salt biocide and d) a laundry detergent adjunct selected from the group consisting of an enzyme, a brightener, a chelant, glycerin, perfume, dye, propane-1,2-diol, citric acid, a buffer, water, monoethanolamine or a combination thereof;

wherein the ratio of the amine oxide to the nonionic surfactant is from about 4:1 to about 1:2.

2. The laundry composition of claim 1, wherein the alkoxylated alcohol nonionic surfactant is in an amount of from about 5 wt % to about 30 wt %.

3. The laundry composition of claim 1, wherein the amine oxide is in an amount of from about 5 wt % to about 20 wt %.

4. The laundry composition of claim 1, wherein the quaternary ammonium salt biocide is a dialkyl dimethyl quaternary ammonium salt.

5. The laundry composition of claim 4, wherein the dialkyl dimethyl quaternary ammonium salt is selected from the group consisting of di-n-decyldimethylammonium chloride, dioctyldimethylammonium chloride, octyl decyl dimethylammonium chloride, di-n-decyldimethylammonium bromide, dioctyldimethylammonium bromide, octyl decyl dimethylammonium bromide, or a combination thereof.

6. The laundry composition of claim 1, wherein the alkoxylated alcohol nonionic surfactant is a $C_{10}$-$C_{16}$ alcohol ethoxylate having between about 6 and 10 moles of ethylene oxide.

7. The laundry composition of claim 1, wherein the chelant is tetrasodium glutamate diacetate and is an amount of from about 1 wt % to about 2 wt %.

8. The laundry composition of claim 6, wherein the alkoxylated alcohol nonionic surfactant is a $C_{10}$-$C_{16}$ alcohol ethoxylate having about 9 moles of ethylene oxide.

9. The laundry composition of claim 6, wherein the alkoxylated alcohol nonionic surfactant is a $C_{14}$-$C_{15}$ alcohol ethoxylate having about 7 moles of ethylene oxide.

10. The laundry composition of claim 9, wherein the amine oxide is in an amount of from about 10 wt % to about 20 wt %.

11. The laundry composition of claim 10, wherein the alcohol ethoxylate is in an amount of from about 8 wt % to about 20 wt %.

12. A method for killing a microorganism selected from the group consisting *Staphylococcus aureus, Klebsiella pneumoniae* or a combination thereof, consisting of treating the organism with the composition of claim 1.

13. The method of claim 12, wherein the alkoxylated alcohol nonionic surfactant is in an amount of from about 5 wt % to about 30 wt %.

14. The method of claim 12, wherein the treatment is treating a combination of *Staphylococcus aureus* and *Klebsiella pneumoniae.*

15. The method of claim 14, wherein the quaternary ammonium salt biocide is a dialkyl dimethyl quaternary ammonium salt.

16. The method of claim 15, wherein the dialkyl dimethyl quaternary ammonium salt is selected from the group consisting of di-n-decyldimethylammonium chloride, dioctyldimethylammonium chloride, octyl decyl dimethylammonium chloride, di-n-decyldimethylammonium bromide, dioctyldimethylammonium bromide, octyl decyl dimethylammonium bromide, or a combination thereof.

17. The method of claim 16 wherein the alkoxylated alcohol nonionic surfactant is a $C_{10}$-$C_{16}$ alcohol ethoxylate having between about 6 and 10 moles of ethylene oxide.

* * * * *